United States Patent

Di Cicco

[11] 3,913,886
[45] Oct. 21, 1975

[54] ROTARY PLUG VALVE

[76] Inventor: Peter A. Di Cicco, 287 Grove St., Brockton, Mass. 02720

[22] Filed: Mar. 6, 1974

[21] Appl. No.: 448,625

[52] U.S. Cl. .............................. 251/215; 251/309
[51] Int. Cl.² .......................................... F16K 5/04
[58] Field of Search ........... 251/309, 312, 310, 311, 251/215; 137/625.22, 625.23

[56] References Cited
UNITED STATES PATENTS

| | | | |
|---|---|---|---|
| 595,759 | 12/1897 | Boekel | 137/625.22 X |
| 874,876 | 12/1907 | Taylor | 137/625.22 X |
| 1,035,441 | 8/1912 | Honabach | 251/309 X |
| 1,349,823 | 8/1920 | Eimer et al. | 251/309 X |
| 3,329,166 | 7/1967 | Kiernan | 251/309 X |

FOREIGN PATENTS OR APPLICATIONS

| | | | |
|---|---|---|---|
| 391,253 | 2/1924 | Germany | 251/309 |
| 1,130,592 | 8/1955 | France | 251/309 |

*Primary Examiner*—Martin P. Schwadron
*Assistant Examiner*—Robert J. Miller
*Attorney, Agent, or Firm*—Bacon & Thomas

[57] ABSTRACT

A rotary plug valve for controlling fluid flow including a cylindrical housing having inlet and outlet ports and a plug rotatably disposed within the housing having a V-shaped passageway therein such that the inlet and outlet ends of the passageway register with the inlet and outlet ports of the housing for the flow of fluid therethrough. When the inlet and outlet ports in the housing are taken out of registry with the inlet and outlet ends of the plug by rotation of the latter, fluid flow through the valve is terminated.

5 Claims, 5 Drawing Figures

OPEN

CLOSED

ROTARY PLUG VALVE

BACKGROUND OF THE INVENTION

1. Field of the Invention

The present invention relates generally to rotary valves wherein a rotating plug member disposed within a housing serves to regulate fluid flow through corresponding ports, openings and/or passageways provided in both the plug member and the housing.

More particularly, the present invention relates to a rotary plug valve wherein corresponding ports and openings form a passageway through the plug member and its associated housing, thereby defining an angular fluid flow path through the openings and ports. Such a rotary plug valve is useful in a variety of applications wherein the precise control of fluid flow, be it hydraulic or gaseous fluid, is desired. Some examples of such applications include liquid or gas containers, pressurized steam apparatus and various forms of plumbing for liquid or gas flow.

2. Description of the Prior Art

The prior art is replete with examples and teachings of various forms of rotary valves which utilize the basic components of an external housing with a plug member rotatably disposed within the housing. A passageway through the plug member registers with an opening in the housing wall in order to permit fluid to flow through the passageway and out the hole. Such prior art rotary valves are well known and assume a variety of forms for different applications and uses. For example, the Larrigan U.S. Pat. No. 1,677,242 and Gilmore U.S. Pat. No. 1,694,468 both disclose rotary valves in the form of faucet assemblies for dispensing fluid from a supply container. The Loomis U.S. Pat. No. 325,256 exemplifies that rotary valves are old for use to control the flow of condensed water or steam from steam cylinders. As a further example, the Vehse U.S. Pat. No. 1,433,049 teaches a very simple form of rotary valve for use in dispensing toothpaste from a collapsible supply tube.

While these and other examples of prior art rotary valves are indicative of the varied structures and applications of such valves, they are not capable of providing the unique manner of fluid flow control now made possible by the valve structure of the present invention.

It is therefore an object of the present invention to provide a rotary valve assembly that is extremely simple in construction and economical to manufacture.

It is another object of the present invention to provide a rotary valve assembly which, by virtue of its simple construction, may be easily and accurately produced.

It is a further object of the present invention to provide a rotary valve assembly which affords an effective seal against fluid flow leakage by means of the valve's inherent design and a minimum of sealing means.

It is yet a further object of the present invention to provide for a rotary valve assembly which has a unique V-shaped fluid flow path.

It is still yet another object of the present invention to provide for a rotary valve assembly which guards against accidental disengagement of the valve assembly's component parts.

SUMMARY OF THE INVENTION

The present invention serves to overcome the basic limitations inherent with known prior art rotary valve assemblies by providing for a rotary plug valve that is extremely simple in construction and includes an angular fluid flow passageway through the housing and plug member of the valve wherein the angle between the inlet flow line and outlet flow line is less than 90°. The housing is hollow and cylindrical in shape with an open end and a closed end. The plug member is threadedly received within the housing and is capable of limited rotational movement therein. In the valve's open position, the plug abuts the closed end wall of the housing, thereby forming a fluidtight seal by utilizing the housing's closed end structure and only a minimum of sealing means. The threaded connection between the housing and the plug member also serves as a fluid seal and prevents accidental disassembly of these two components during use.

DESCRIPTION OF THE DRAWINGS

The nature and advantages of the present invention will be better understood when the following detailed description is taken in connection with the accompanying drawings wherein.

DESCRIPTION OF THE PREFERRED EMBODIMENT

Figure 1:
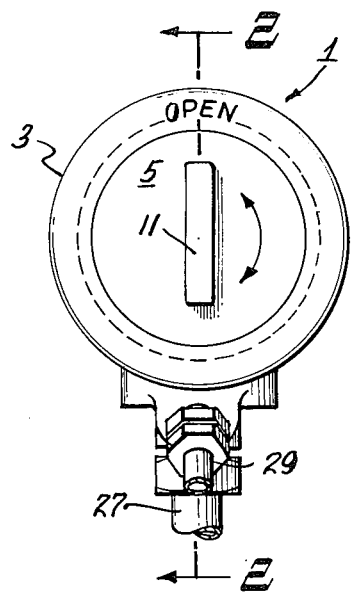
FIG. 1 is a top view of the rotary plug valve assembly of the present invention.
Figure 2:
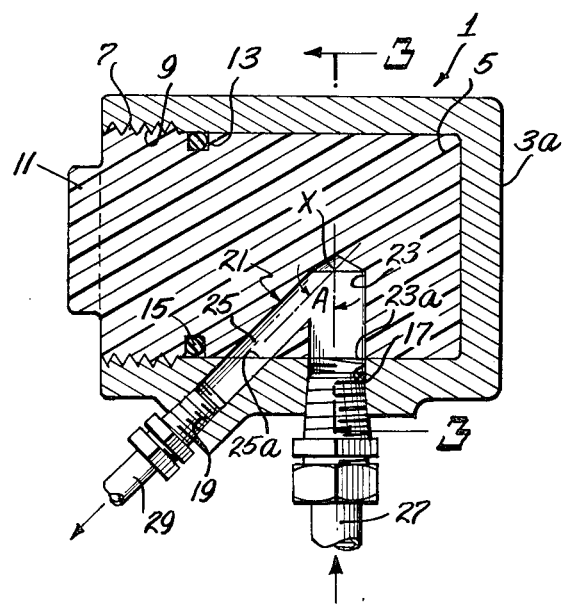
FIG. 2 is a vertical sectional view taken along line 2—2 of FIG. 1.
Figure 5:
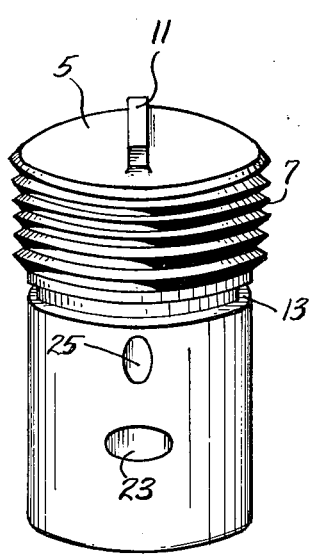
FIG. 5 is a perspective view of the plug member of the rotary plug valve assembly comprising the present invention.

Referring first to FIGS. 1 and 2 of the drawings, there is shown a rotary plug valve assembly 1 of the present invention. The assembly 1 includes a generally cylindrical-shaped hollow outer housing 3 having a closed end 3a. A substantially cylindrical-shaped plug member 5 conforming to the housing's hollow interior is rotatably disposed therein. The plug member 5 is provided with male threads 7 so that it may be threadedly received within corresponding female threads 9 provided within the internal surface of housing 3 (such threads may be either right hand or left hand threads). The plug member 5 is capable of limited rotational movement within housing 3 and abuts the end wall 3a when in its fully inserted position as shown in FIG. 2 The exposed end of plug member 5 is provided with a handle means 11 for facilitating the rotation of plug member 5 within housing 3. An annular groove 13 is provided around the periphery of plug member 5 for receiving a suitable sealing means 15 in the form of an O-ring gasket or the like. As seen in FIG. 2, a fluidtight seal is achieved by virtue of the closed end construction of housing 3, the single sealing means 15, and the threaded connection 7 and 9. Further, the threaded connection 7 and 9 prevents accidental disassembly of plug member 5 from housing 3.

As is evident in FIG. 2, housing 3 is provided with an inlet port 17 and an outlet port 19. The central axis of port 17 is substantially perpendicular to the longitudinal axis of the housing 3. The central axes of both ports 17 and 19 intersect at a point X which may or may not coincide with the longitudinal central axis of the housing 3. The angle A formed by the intersection of the central axes of inlet port 17 and outlet port 19 is an acute angle, i.e., less than 90°. A V-shaped passageway 21 is provided through the plug member 5 and comprises an inlet leg 23 and an outlet leg 25. The inlet leg 23 and outlet leg 25 terminate at the exterior surface of the plug member forming end openings 23a and 25a, respectively.

Figure 3:
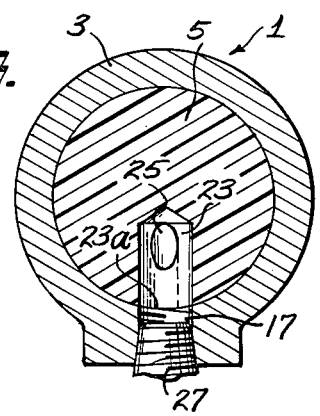
FIG. 3 is a vertical sectional view taken along line 3—3 of FIG. 2 showing the valve in its open position.
Figure 4:
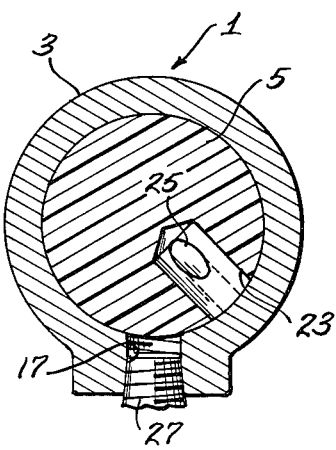
FIG. 4 is a vertical sectional view similar to that shown in FIG. 3 with the valve in its closed position.

With the plug member 5 in the position shown in FIGS. 2 and 3, inlet port 17 registers with opening 23a and outlet port 19 registers with outlet opening 25a. In this position, the end of plug member 5 abuts end wall 3a and the central axes of leg 23 and leg 25 of the passageways coincide with the central axes of inlet port 17 and outlet port 19, respectively. As is evident in FIG. 4, when plug member 5 is rotated counterclockwise (or clockwise if left hand threads are utilized), inlet opening 23a and outlet opening 25a are taken out of registration with inlet port 17 and outlet port 19.

FIGS. 1 through 4 depict threaded conduit connections 27 and 29 to inlet port 17 and outlet port 19. However, such connections can also be welded, soldered, pressure fitted, or achieved by any other suitable connection means well known in the art and especially suitable for any intended particular application of the rotary valve assembly of the present invention. Further, the plug member and housing may be made of any suitable materials well known in the prior art for such devices, with the choice being naturally dictated by the operational or environmental application of the valve. Such materials may be steel, bronze, brass, or other such metals as may be found to be suitable. Further, the entire rotary valve assembly may be constructed of plastic materials. A combination of any of these indicated materials may also be found to be desirable for special applications, i.e., a metallic housing 3 provided with a plastic plug member 5 or vice versa.

BASIC MODE OF OPERATION

In use, the rotary valve assembly 1 of the present invention is connected to the fluid source desired to be controlled by means of inlet conduit 27 and outlet conduit 29. Assuming a right hand thread connection, by rotating plug member 5 clockwise through handle means 11, inlet port 17 is brought into registration with inlet opening 23a, outlet port 19 is brought into registration with outlet opening 25a and plug member 5 is brought into abutment against end wall 3a. In this position, the valve is open and fluid is sent through conduit 27, passes through V-shaped passageway 21 and exits out conduit 29, thereby describing an angular flow path of less than 90° between the inlet and outlet flow streams. When it is desired to terminate fluid flow, plug member 5 is rotated again by turning handle means 11 counterclockwise such that registration is removed between inlet and outlet ports 17 and 19 and inlet and outlet openings 23a and 25a, respectively.

While the foregoing description is directed towards the embodiment illustrated, it is to be fully understood that the present invention is fully capable of undergoing changes and modifications without departing from the basic scope of the invention as set forth by the following claims:

I claim:

1. A rotary valve for controlling fluid flow, which valve comprises, in combination:
  a. a substantially cylindrical housing having a closed end wall and provided with an inlet port and an outlet port through the side wall thereof wherein:
    1. the central axis of the inlet port is substantially perpendicular to the longitudinal axis of the housing, and
    2. the central axis of the outlet port intersects and forms an acute angle with the central axis of the inlet port, and
  b. a substantially cylindrical plug rotatably disposed and threadedly connected within the housing for limited rotational movement such that the plug abuts against the end wall when the valve is in an open position, which plug includes only an angular passageway therethrough with the ends of the passageway forming an inlet opening registering in linear continuation with the respective inlet and outlet ports in the housing in one position of rotation of the plug, with the cross-sectional diameters of the corresponding ports and openings being the same and forming smooth linear passageways for fluid flow therethrough.

2. The rotary valve of claim 1 wherein the plug includes a handle means for facilitating the rotation thereof.

3. The rotary valve of claim 1 wherein the plug includes a peripheral groove having a sealing means disposed therein.

4. The rotary valve of claim 3 wherein the sealing means engages the interior surface of the housing between the threaded connection and the outlet port.

5. The rotary valve of claim 3 wherein the sealing means is an O-ring gasket.

* * * * *